United States Patent
Kusunoki et al.

(10) Patent No.: US 8,466,782 B2
(45) Date of Patent: Jun. 18, 2013

(54) TIRE INFLATION PRESSURE MONITORING APPARATUS

(75) Inventors: Hideki Kusunoki, Nishikamo-gun (JP); Hideki Ohashi, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 611 days.

(21) Appl. No.: 12/676,669

(22) PCT Filed: Apr. 24, 2009

(86) PCT No.: PCT/JP2009/001904
§ 371 (c)(1),
(2), (4) Date: Mar. 5, 2010

(87) PCT Pub. No.: WO2010/122610
PCT Pub. Date: Oct. 28, 2010

(65) Prior Publication Data
US 2011/0148617 A1    Jun. 23, 2011

(51) Int. Cl.
*B60C 23/00* (2006.01)
(52) U.S. Cl.
USPC .......................... 340/442; 73/146.4; 73/146.5
(58) Field of Classification Search
USPC ..... 340/427, 438, 442, 444, 445, 447; 73/146, 73/146.2, 146.4, 146.5
See application file for complete search history.

(56) References Cited

U.S. PATENT DOCUMENTS 5,604,307 A * 2/1997 Iida et al. .................... 73/146.2

(Continued)

FOREIGN PATENT DOCUMENTS

JP    11 20429    1/1999
JP    2002 225519    8/2002

(Continued)

OTHER PUBLICATIONS

International Search Report issued Aug. 11, 2009 in PCT/JP09/001904 filed Apr. 24, 2009.

(Continued)

*Primary Examiner* — Brian Zimmerman
*Assistant Examiner* — An T Nguyen
(74) *Attorney, Agent, or Firm* — Oblon, Spivak, McClelland, Maier & Neustadt, L.L.P.

(57) ABSTRACT

An inflation pressure sensor is mounted in a wheel of a vehicle and determines a tire inflation pressure. A wheel-side communication device transmits a detected tire inflation pressure to a body-side communication device at a predetermined interval. An inflation pressure storing unit stores, as an after-travel inflation pressure, a tire inflation pressure after start of travel of the vehicle. A comparing unit compares the after-travel inflation pressure with a lowest reference pressure. The lowest reference pressure is a tire inflation pressure immediately after start of the vehicle or a predetermined recommended inflation pressure. A reference pressure setting unit sets the after-travel inflation pressure as a reference pressure of tire inflation pressure determination when the after-travel inflation pressure is higher than the lowest reference pressure, and sets the lowest reference pressure as a reference pressure of tire inflation pressure determination when the after-travel inflation pressure is equal to or lower than the lowest reference pressure. When the tire inflation pressure becomes below an alarm pressure threshold obtained from the reference pressure, an alarm unit generates an alarm.

7 Claims, 8 Drawing Sheets

U.S. PATENT DOCUMENTS

| | | | |
|---|---|---|---|
| 6,518,875 B2 * | 2/2003 | DeZorzi | 340/442 |
| 6,965,304 B2 * | 11/2005 | Yonetani et al. | 340/444 |
| 8,198,993 B2 * | 6/2012 | Kessler et al. | 340/447 |
| 2002/0105420 A1 | 8/2002 | Yamagiwa et al. | |
| 2004/0233049 A1 * | 11/2004 | Harada et al. | 340/442 |
| 2005/0242936 A1 * | 11/2005 | Watabe | 340/442 |
| 2012/0197551 A1 * | 8/2012 | Kitano | 702/50 |

FOREIGN PATENT DOCUMENTS

| | | |
|---|---|---|
| JP | 2003 246211 | 9/2003 |
| JP | 2003 267011 | 9/2003 |
| JP | 2005 178634 | 7/2005 |
| JP | 2006 193015 | 7/2006 |
| JP | 2007 76457 | 3/2007 |
| JP | 2007 253847 | 10/2007 |
| JP | 2008 120275 | 5/2008 |
| WO | 2004 021302 | 3/2004 |

OTHER PUBLICATIONS

International Preliminary Report on Patentability and Written Opinion issued Oct. 25, 2011 in patent application No. PCT/JP2009/001904 filed Apr. 24, 2009 with English Translation.

International Preliminary Report on Patentability and Written Opinion issued Nov. 22, 2011 in patent application No. PCT/JP2009/001904 filed Apr. 24, 2009.

* cited by examiner

TIRE INFLATION PRESSURE MONITORING APPARATUS

FIELD OF THE INVENTION

The present invention relates to a technique of monitoring pressure in a tire inflation chamber in a vehicle.

DESCRIPTION OF THE RELATED ART

It is preferable to monitor a wheel state such as internal inflation pressure of a tire from the viewpoint of realizing comfortable vehicle driving with appropriate wheels. Consequently, various methods of monitoring a wheel state such as a change in pressure in a tire have been proposed.

Recently, as represented by a tire pressure monitoring system (abbreviated as "TPMS" below), a system for detecting wheel states such as internal inflation pressures of tires by sensors and the like provided for wheels and transmitting them to an electronic control unit (abbreviated as "ECU" below), a receiver, and the like provided for a vehicle body is being spread. In many cases, the sensor or the like provided for each wheel uses, as an energy source, a battery provided for the wheel side, not a battery provided for the vehicle body side. Consequently, some of such systems save energy consumption of batteries by decreasing the number of transmission times of information from the wheels to the vehicle body.

For example, patent document 1 discloses a tire pressure detecting apparatus for transmitting a transmission frame only when a change in tire inflation pressure becomes equal to or larger than a predetermined threshold. Patent document 2 discloses a wheel state monitoring system for transmitting data indicative of the states of wheels to the vehicle body side at intervals according to rotational speed of the wheels. Patent document 3 discloses a wheel state monitoring system for changing transmission frequency of vehicle information when a predetermined change in a vehicle state is detected.

[Patent document 1] Japanese Patent Application Laid-Open No. 2007-76457
[Patent document 2] International Patent Application Publication No. 2004-21302
[Patent document 3] Japanese Patent Application Laid-Open No. 2008-120275

SUMMARY OF THE INVENTION

Problems to be Solved by the Invention

In the tire pressure monitoring apparatus as described above, in the case where, after the tire inflation pressure is adjusted indoor, the vehicle travels under low-temperature environment or on a snowy road, there is a possibility that a threshold of alarm becomes improper due to reduction in the tire inflation pressure caused by a temperature drop, and an erroneous alarm or delay in alarm occurs.

The present invention has been achieved in consideration of such circumstances and an object of the invention is to provide a technique of setting a reference value of a proper tire inflation pressure alarm according to circumstances of a vehicle.

Means for Solving the Problems

A first aspect of the present invention relates to a tire inflation pressure monitoring apparatus. The apparatus includes: a tire inflation pressure obtaining unit which obtains a tire inflation pressure; an inflation pressure storing unit which stores a tire inflation pressure after start of travel of a vehicle as an after-travel inflation pressure; a comparing unit which determines whether or not a difference between the after-travel inflation pressure and a lowest reference pressure is larger than a predetermined pressure indicating that temperature of a tire inflation chamber rises higher than temperature immediately after start of the vehicle; a reference pressure setting unit which sets the after-travel inflation pressure as a reference pressure of tire inflation pressure determination when the difference is larger than the predetermined pressure, and sets the lowest reference pressure as a reference pressure of tire inflation pressure determination when the difference is equal to or less than the predetermined pressure; and an alarm unit which generates an alarm when the tire inflation pressure becomes below an alarm pressure threshold which is determined from the reference pressure.

For example, when an alarm of a tire inflation pressure is made using a tire inflation pressure after lapse of predetermined time since start of travel of a vehicle, in the case where temperature of outside air in which the vehicle travels is much lower than that at start of the vehicle, the reference pressure may be set to be lower than assumed one. There is consequently a possibility that an alarm of the tire inflation pressure gets delayed. In this aspect, in the case where the difference between the after-travel inflation pressure and the lowest reference pressure is equal to or lower than the predetermined pressure, the tire inflation pressure is determined based on the lowest reference pressure. Thus, an alarm of the tire inflation pressure does not get delayed.

A second aspect of the present invention also relates to a tire inflation pressure monitoring apparatus. The apparatus includes: a tire inflation pressure obtaining unit which obtains tire inflation pressure; an inflation pressure storing unit which stores a tire inflation pressure after start of travel of a vehicle as an after-travel inflation pressure; a pressure reduction determining unit which determines reduction in the tire inflation pressure based on the tire inflation pressure obtained; a reference pressure setting unit which sets larger one of the after-travel inflation pressure and a predetermined lowest reference pressure as a reference pressure of tire inflation pressure determination when reduction in the tire inflation pressure is determined, and sets the lowest reference pressure as a reference pressure of tire inflation pressure determination when reduction in the tire inflation pressure is not determined; and an alarm unit which generates an alarm when the tire inflation pressure becomes below an alarm pressure threshold which is determined from the reference pressure.

For example, when an alarm of a tire inflation pressure is made using a tire inflation pressure after lapse of predetermined time since start of travel of a vehicle, in the case where temperature of outside air in which the vehicle travels is much lower than that at start of the vehicle, if an alarm pressure threshold is set based on the after-travel air pressure, delay in an alarm of puncture may occur. According to this aspect, in the case where the tire inflation pressure reduction is determined, an alarm threshold is set based on larger one of an after-travel inflation pressure which is stored just before and a predetermined lowest reference pressure. Therefore, even in the case where the tire inflation chamber temperature is low, a proper alarm threshold can be set.

The comparing unit may use a tire inflation pressure immediately after start of the vehicle as the lowest reference pressure, or may use a recommended inflation pressure determined by a vehicle manufacturer as the lowest reference pressure.

The inflation pressure storing unit may store, as an after-travel inflation pressure, a tire inflation pressure when the vehicle travels at a vehicle speed equal to or higher than a predetermined speed for predetermined accumulation time. In this case, by counting time in which the vehicle travels at a predetermined speed or higher, it can be estimated that the temperature in the tire inflation chamber rises during the time.

The apparatus may further include a vehicle speed determining unit which shortens an interval of obtaining the tire inflation pressure when the accumulation time reaches predetermined time. With the configuration, the probability of obtaining the tire inflation pressure on the body side increase, and a tire inflation pressure used for setting the reference pressure can be obtained with reliability.

Aspects of expressing the present invention in methods, apparatuses, systems, recording media, and computer programs, aspects obtained by changing the expressions, aspects obtained by changing the order of processes of the present invention, and the like are also effective as aspects of the present invention.

Effects of the Invention

According to the present invention, even in the case where a large drop in environment temperature or reduction in the tire inflation pressure after start of a vehicle occurs, a proper reference pressure for generating an inflation pressure alarm can be set.

DESCRIPTION OF REFERENCE NUMERALS 10 vehicle, 12 vehicle body, 14 wheel, 20 wheel-side unit, 21 inflation pressure sensor, 22 wheel-side communication device, body-side communication device, 27 alarm, 28 initialization switch, 30 ECU, 32 wheel speed sensor, 40 determining unit, 42 vehicle speed determining unit, 46 timer, inflation pressure storing unit, 52 comparing unit, 54 reference pressure setting unit, 56 alarm unit, 60 pressure reduction determining unit

BEST MODE FOR CARRYING OUT THE INVENTION

Referring to the drawings, best modes for carrying out the present invention will be described in detail below. In the explanation of the drawings, the same reference numeral is designated to the similar elements and repetitive description will not be given.

First Embodiment

Figure 1:
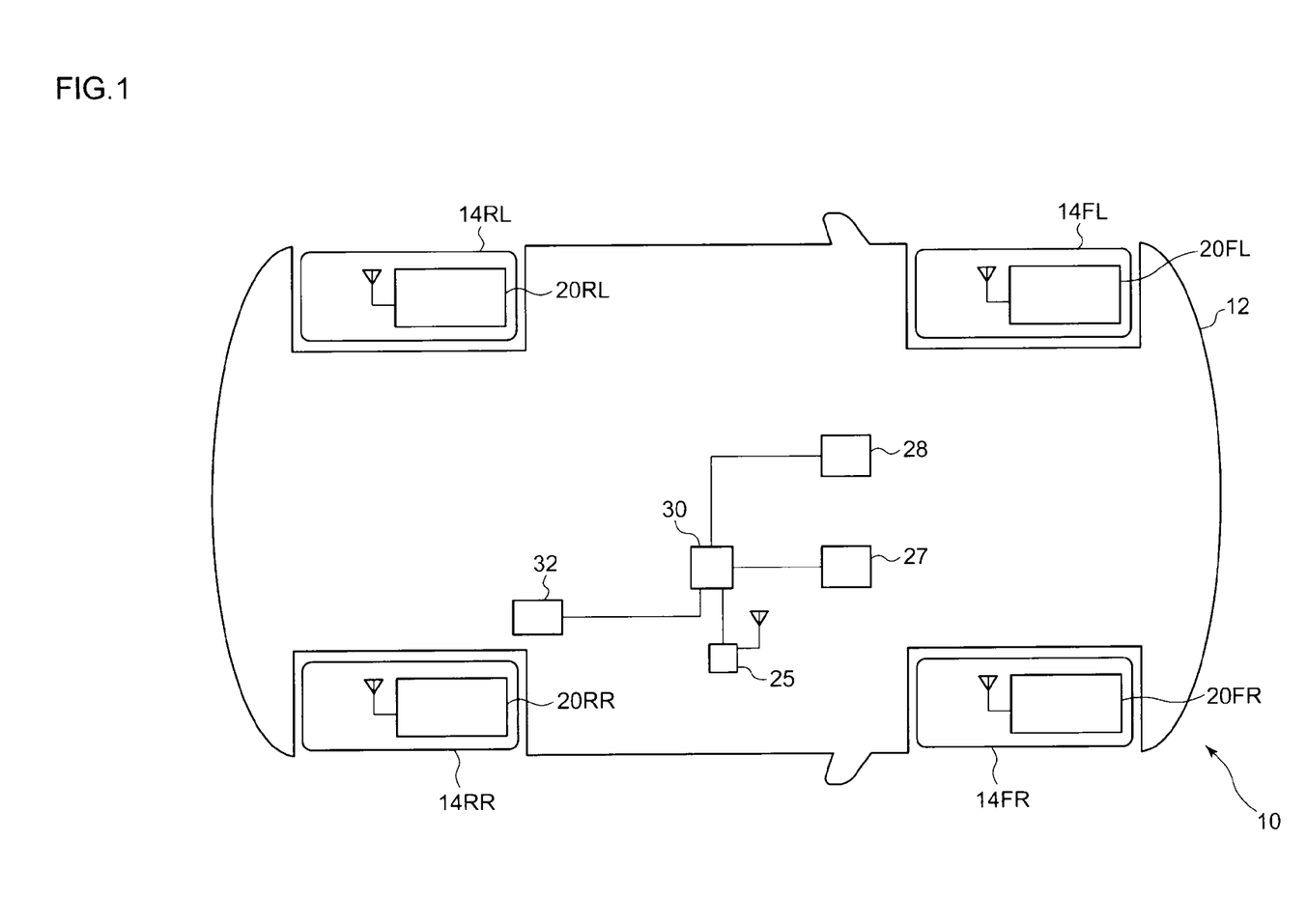
FIG. 1 is a schematic configuration diagram showing a vehicle having a tire pressure monitoring apparatus according to a first embodiment.

FIG. 1 is a schematic configuration diagram showing a vehicle having a wheel information transmitting apparatus and a wheel information processing apparatus according to a first embodiment. A vehicle 10 shown in the diagram has a mechanism of monitoring internal inflation pressure in a tire. The vehicle 10 has a vehicle body 12, four wheels 14FR, 14FL, 14RR, and 14RL (in the following, arbitrarily, the wheels 14FR to 14RL will be generically called "wheels 14"), a not-shown steering device for steering the wheels 14FR and 14FL as steering wheels, and a not-shown travel driving source for driving drive wheels in the wheels 14, or the like. Each of the wheels 14 includes a tire filled with air and a wheel (not shown) for supporting the tire.

On the vehicle body 12, a body-side communication device 25, an alarm 27, an initialization switch 28, a wheel speed sensor 32, and an ECU (Electron Control Unit) 30 connected to those components are mounted.

To the wheels 14, wheel-side units 20FR, 20FL, 20RR, and 20RL (in the following, arbitrarily, those will be generically called "wheel-side units 20") for detecting inflation pressure of the tires are attached.

Figure 2:
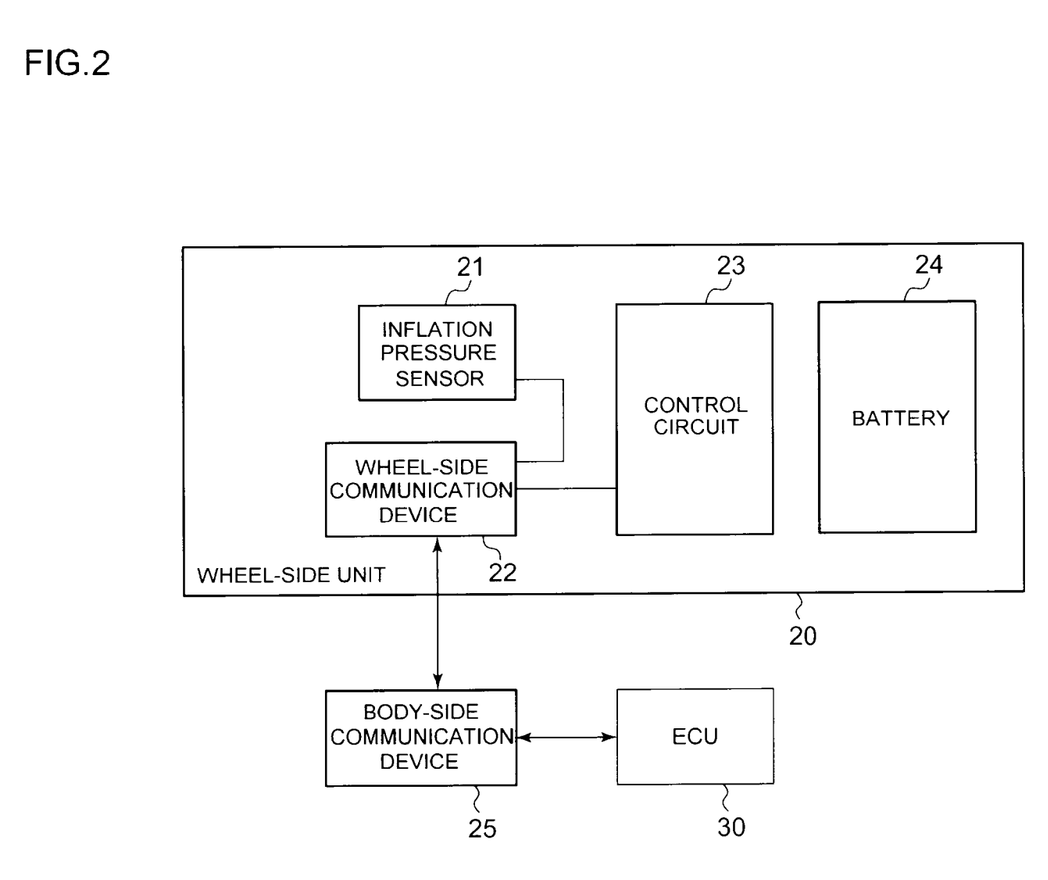
FIG. 2 is a block diagram for explaining a wheel-side unit included in the vehicle of FIG. 1.

FIG. 2 is a block diagram for explaining the wheel-side unit 20 shown in FIG. 1. On each of the wheel-side unit 20, an inflation pressure sensor 21, a wheel-side communication device 22 connected to the inflation pressure sensor 21, a control circuit 23 connected to the wheel-side communication device 22, and a battery 24 are mounted. With the configuration, the wheel-side unit 20 functions as a wheel information transmitting apparatus capable of obtaining tire inflation pressure and periodically transmitting it to the body-side communication device 25. In the following description, the wheel-side unit 20 obtained by integrating the functions in a module will be described as an example. It is also possible to form the functions as different units and provide the units to each wheel.

The inflation pressure sensor 21 is, for example, a semiconductor sensor, detects inflation pressure in a tire inflation chamber, and outputs a detection signal according to the inflation pressure to the wheel-side communication device 22.

The wheel-side communication device 22 is constructed so as to be able to transmit a detection signal of the inflation pressure sensor 21 to the body-side communication device 25 by radio. The wheel-side communication device 22 operates in either a normal transmission mode of transmitting a detection signal of the inflation pressure sensor 21 at low frequency (for example, once per minute) and a transmission-interval-shortened mode of transmitting a detection result of the inflation pressure sensor 21 at high frequency (for example, once per ten seconds).

The control circuit 23 is mounted on an IC chip or the like and controls the inflation pressure sensor 21 and the wheel-side communication device 22. The control circuit 23 determines a transmission mode of the wheel-side communication device 22 in accordance with an instruction transmitted from the ECU 30 on the body side. As long as no instruction from the ECU 30 is received, the normal transmission mode is selected. When there is an instruction from the ECU 30, the wheel-side communication device 22 is operated in the transmission-interval-reduced mode only for a predetermined period. By increasing the operation time in the low frequency as long as possible, energy consumption amount of the battery is saved.

The battery 24 supplies power to the inflation pressure sensor 21, the wheel-side communication device 22, and the control circuit 23.

On the other hand, on the body 12 of the vehicle 10, as shown in FIGS. 1 and 2, the electron control unit (hereinbelow, called "ECU") 30 as processing means which executes various controls by using information transmitted from the wheel-side communication device 22 of the wheel-side unit 20 is mounted. The ECU 30 has a CPU for executing various computing processes, a ROM that stores various control programs, a RAM used as a work area for data storage and program execution, an input/output interface, a storing device, and the like.

The body-side communication device 25 performs communication of signals with the wheel-side communication device 22 included in the wheel-side unit 20 of each wheel 14. The device 25 receives a signal of an electric wave transmitted from the wheel-side communication device 22 by radio and gives information included in the electric wave to the ECU 30. The alarm 27 issues a warning to the driver when the tire inflation pressure of each wheel 14 drops under control of the ECU 30, and includes, for example, a warning display device, a warning buzzer, and the like provided in an instrument panel of the vehicle 10.

The wheel speed sensor 32 can have an arbitrary configuration capable of detecting the speed of the vehicle 10 directly or indirectly and, for example, may detect the speed of the vehicle 10 indirectly from a detection result of a sensor for detecting the rotational speed of the wheel 14. The vehicle speed sensor is connected to the ECU 30 and transmits a detection result to the ECU 30.

Figure 3:
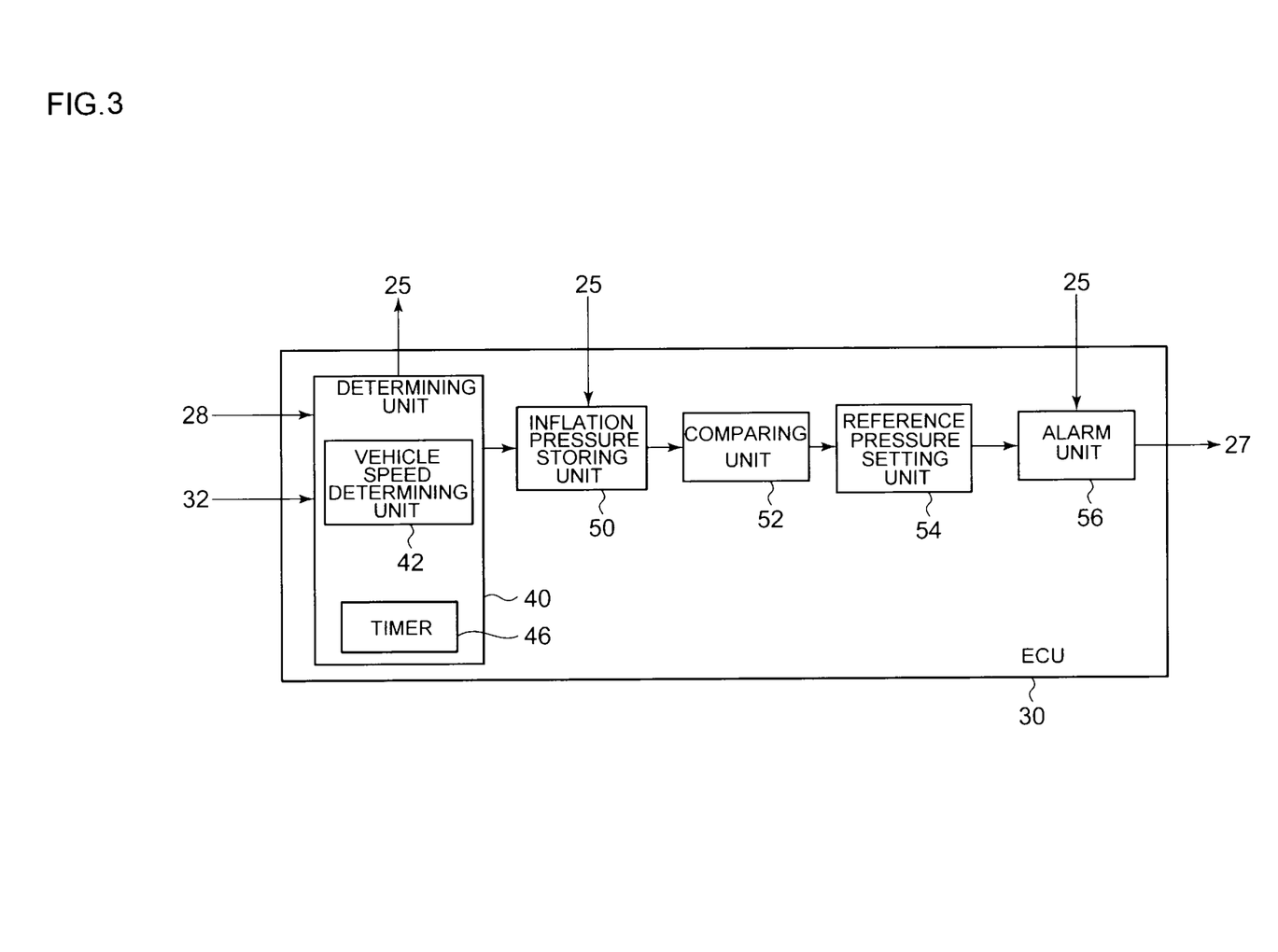
FIG. 3 is a functional block diagram showing the function related to monitoring of tire inflation pressure in various functions of an ECU.

FIG. 3 is a functional block diagram showing the functions on monitoring of internal inflation pressure of a tire in various functions of the ECU 30. Each of the blocks can be realized by, in hardware, an element or a mechanical device such as a CPU and a memory of a computer or, in software, a computer program or the like. The blocks are drawn here as functional blocks realized by cooperation of them. It is therefore understood by a person skilled in the art that the functional blocks can be realized by various combinations of the hardware and software.

A determining unit 40 includes a vehicle speed determining unit 42 and a timer 46. The vehicle speed determining unit 42 calculates vehicle speed based on a detection signal from the wheel speed sensor 32 and, when the calculated vehicle speeds exceeds a predetermined speed, instructs the wheel-side communication device 22 to shorten the transmission interval of the tire inflation pressure. Referring to the timer 46, the determining unit 40 measures accumulated travel time in which the vehicle traveled at the predetermined speed or higher and determines whether the accumulated travel time exceeds the predetermined value or not. The determination will be described in detail later.

An inflation pressure storing unit 50 obtains tire inflation pressures received by the body-side communication device 25 in a predetermined period and stores the maximum value. In the embodiment, the operation is performed twice; immediately after start of the vehicle, and after travel of predetermined time. The tire inflation pressure immediately after start of the vehicle is stored as just-after-start inflation pressure and the tire inflation pressure after travel of predetermined time is stored as after-travel inflation pressure.

After the after-travel inflation pressure is stored by the inflation pressure storing unit 50, a comparing unit 52 compares the difference between the after-travel inflation pressure and the lowest reference pressure with a predetermined pressure. The lowest reference pressure is set based on the just-after-start inflation pressure or recommended inflation pressure which is determined by a vehicle manufacturer.

When the difference is larger than the preset pressure, the reference pressure setting unit 54 sets the after-travel inflation pressure as the reference pressure of the tire inflation pressure determination. When the difference is equal to or lower than the predetermined pressure, the reference pressure setting unit 54 sets the lowest reference pressure as the reference pressure of the inflation pressure determination.

An alarm unit 56 monitors the tire inflation pressure transmitted from the body-side communication device 25 and, when the tire inflation pressure becomes below an alarm pressure threshold obtained by decreasing the reference pressure set by the reference pressure setting unit 54 by a predetermined ratio (for example, 20%), the alarm unit 56 puts the alarm 27 into operation.

The action of the wheel state adjustment system according to the embodiment realized by the above-described configuration will now be described.

When the vehicle travels, the tire inflation pressure is periodically detected by the inflation pressure sensor 21 and, normally, transmitted from the wheel-side communication device 22 to the body-side communication device 25 at low frequency.

Information of the tire inflation pressure received by the body-side communication device 25 is sent to the ECU 30. In the ECU 30, the reference pressure of the tire inflation pressure alarm is determined by a procedure which will be described in detail later and, after that, monitoring of the tire inflation pressure is continued. When the tire inflation pressure becomes below the alarm pressure threshold obtained by decreasing the reference pressure by the predetermined ratio, the alarm 27 is put into operation. The alarm 27 calls attention of the driver or the like by alarm sound, a warming lamp, or the like.

It is also possible to provide a wheel speed sensor near a tire in place of providing a wheel with an inflation pressure sensor and provide a tire inflation pressure estimating unit for estimating tire inflation pressure based on the wheel speed on the body side. The tire inflation pressure estimating unit prestores, for example, standard wheel speed when a tire is set to the recommended inflation pressure and tire inflation pressure can be estimated based on comparison of the standard wheel speed with the actual wheel speed. In this case, the wheel-side unit is unnecessary and, therefore, communication between the wheel and the vehicle body is also unnecessary.

Figure 4:
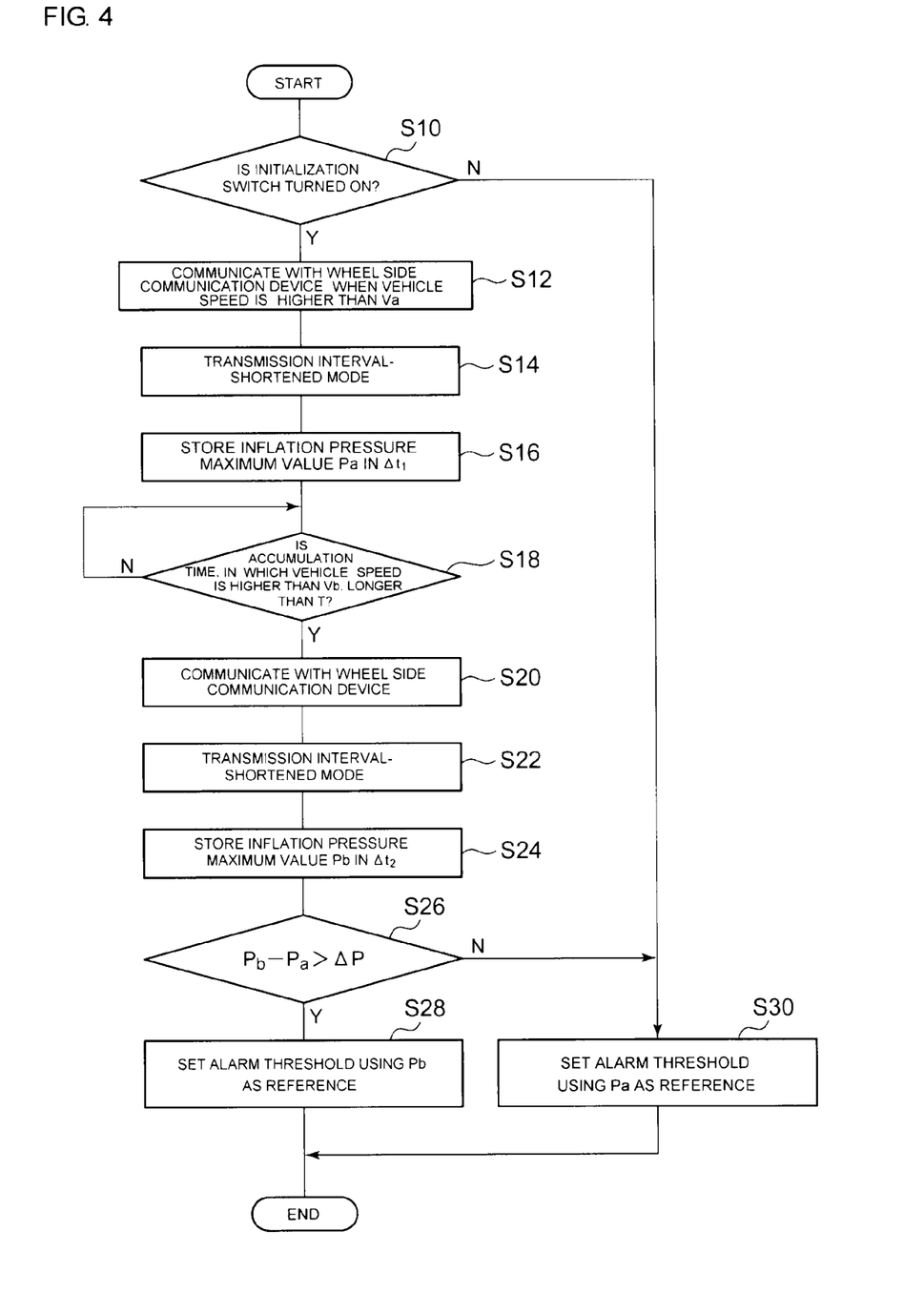
FIG. 4 is a flowchart of tire inflation pressure monitoring according to the first embodiment.

FIG. 4 is a flowchart of tire inflation pressure monitoring according to the first embodiment. First, a driver adjusts tire inflation pressure of a vehicle to a recommended inflation pressure determined by the vehicle manufacturer and, after that, turns on the initialization switch 28 mounted in the chamber of the vehicle or the like. The recommended inflation pressure varies according to the type of the vehicle 10, and is determined in consideration of the travel performance, operability, fuel consumption, and the like of the vehicle. Generally, the recommended inflation pressure at the time of normal travel and that at the time of high-speed travel are different from each other. Therefore, the driver performs adjustment by selecting a proper recommended inflation pressure according to travel schedule of the vehicle.

When the initialization switch is not turned on (No in step S10), it is determined that the tire inflation pressure is not adjusted, and the program advances to step S30 which will be described later. In the case where the initialization switch is turned on (Yes in step S10), the vehicle speed determining unit 42 calculates vehicle speed based on a detection signal from the wheel speed sensor 32, and determines whether the vehicle speed is greater than a predetermined threshold $V_a$ or not. The threshold $V_a$ is used to determine that the vehicle starts traveling and is set to, for example, about 10 km/h. When the vehicle speed becomes larger than $V_a$, the vehicle speed determining unit 42 instructs the wheel-side communication device 22 to shift to a transmission interval-shortened mode (S12). The wheel-side communication device 22 transmits a tire inflation pressure detection value to the body-side communication device 25 only for a predetermined period $\Delta t_1$ in the transmission interval-shortened mode (S14), and the inflation pressure storing unit 50 stores the maximum tire inflation pressure in tire inflation pressures received in $\Delta t_1$ by the body-side communication device 25 as an immediately-after-start inflation pressure $P_a$ (S16). In the transmission interval shortened mode, by temporarily increasing the number of transmission times of the tire inflation pressure, the probability of reception of the tire inflation pressure transmitted from the wheel side to the body side by radio is increased, and the life of the battery 24 on the wheel side is increased.

Subsequently, the vehicle speed determining unit 42 obtains accumulation time of travel at a vehicle speed higher than a predetermined threshold Vb (for example, 50 km/h) with reference to a detection signal from the wheel speed sensor 32 and the count of the timer 46, and determines whether the accumulation time is longer than a threshold T (for example, 15 minutes) or not (S18). When the accumulation time is equal to or less than the threshold T (No in step S18), subsequently, the accumulation time is obtained. When the accumulation time exceeds the threshold T (Yes instep S18), the vehicle speed determining unit 42 instructs the wheel-side communication device 22 to enter the transmission interval shortened mode (S20). The wheel-side communication device 22 transmits a tire inflation pressure detection value to the body-side communication device 25 only for a predetermined period $\Delta t_2$ in the transmission interval-shortened mode (S22), and the inflation pressure storing unit 50 stores the maximum tire inflation pressure in tire inflation pressures received in $\Delta t_2$ by the body-side communication device 25 as an after-travel inflation pressure $P_b$ (S24). The determination of step S18 is performed to determine that the temperature in the tire inflation chamber rises to a temperature close to saturation when the vehicle travels under environment of a certain temperature (for example, 20° C.). As the thresholds $V_b$ and T, proper values are selected by an experiment or the like. Alternatively, the thresholds $V_b$ and T may be selected so that the tire inflation chamber temperature rises to a temperature obtained by decreasing the saturation temperature by a predetermined ratio.

The comparing unit 52 compares the difference between the after-travel inflation pressure $P_b$ and the immediately-after-start inflation pressure $P_a$ with the predetermined pressure $\Delta P$ (S52). When ($P_b-P_a$) is larger than $\Delta P$ (Yes in step S26), the reference pressure setting unit 54 sets the after-travel inflation pressure $P_b$ as a reference pressure of the tire inflation pressure determination (S28). When ($P_b-P_a$) is equal to or less than $\Delta P$ (No in step S26), the reference pressure setting unit 54 sets the immediately-after-start inflation pressure $P_a$ as a reference pressure of the tire inflation pressure determination (S30). Alternatively, the recommended inflation pressure may be set as the reference pressure.

The alarm unit 56 monitors the tire inflation pressure transmitted from the body-side communication device 25. When the tire inflation pressure becomes below an alarm pressure threshold obtained by decreasing the reference pressure which is set in step S28 or S30 by a predetermined ratio, the alarm unit 56 makes the alarm 27 operate.

In step S26, whether the temperature in the tire inflation chamber is higher than temperature immediately after start of the vehicle or not is determined by comparing the after-travel inflation pressure $P_b$ with the immediately-after-start inflation pressure $P_a$. When the vehicle travels under environment of a certain temperature (for example, 20° C.) or less for the accumulation time or longer, $\Delta P$ is set to an assumed increased tire inflation pressure. For example, in the case where, after the tire inflation pressure is adjusted indoor, the vehicle travels under low-temperature environment or on a snowy road, even when the condition of the accumulation travel time in step S18 is satisfied, since the tire inflation chamber temperature is low, there is a possibility that the after-travel inflation pressure $P_b$ is below the inflation pressure immediately after start or hardly changes. If an alarm pressure threshold is set using the after-travel inflation pressure Pb as a reference pressure when the tire inflation chamber temperature is low as described above, there is a possibility that an alarm is generated too late.

According to the embodiment, in the case where the difference between the after-travel inflation pressure $P_b$ and the immediately-after-start inflation pressure $P_a$ is $\Delta P$ or less, the alarm pressure threshold is set using the immediately-after-start inflation pressure $P_a$ or recommended inflation pressure as a reference pressure. Consequently, it can be prevented that when the tire inflation chamber temperature is low, the alarm pressure threshold is set to be low.

On the contrary, in the case where the tire inflation chamber temperature is sufficiently high and the difference between the after-travel inflation pressure $P_b$ and the immediately-after-start inflation pressure $P_a$ is larger than $\Delta P$, the alarm pressure threshold is set based on the after-travel inflation pressure $P_b$. Since the alarm pressure threshold is higher than the immediately-after-start inflation pressure $P_a$ and the recommended inflation pressure, in the case where the tire inflation chamber temperature is high, the threshold of alarm increases. Therefore, alarm is generated earlier and safety improves.

In the flowchart of FIG. 4, an instruction to shorten the transmission interval is given from the body-side vehicle speed determining unit 42 to the wheel-side communication device 22. Alternatively, the alarm pressure threshold for an inflation pressure alarm can be set without the instruction from the body side to the wheel side.

Figure 5:
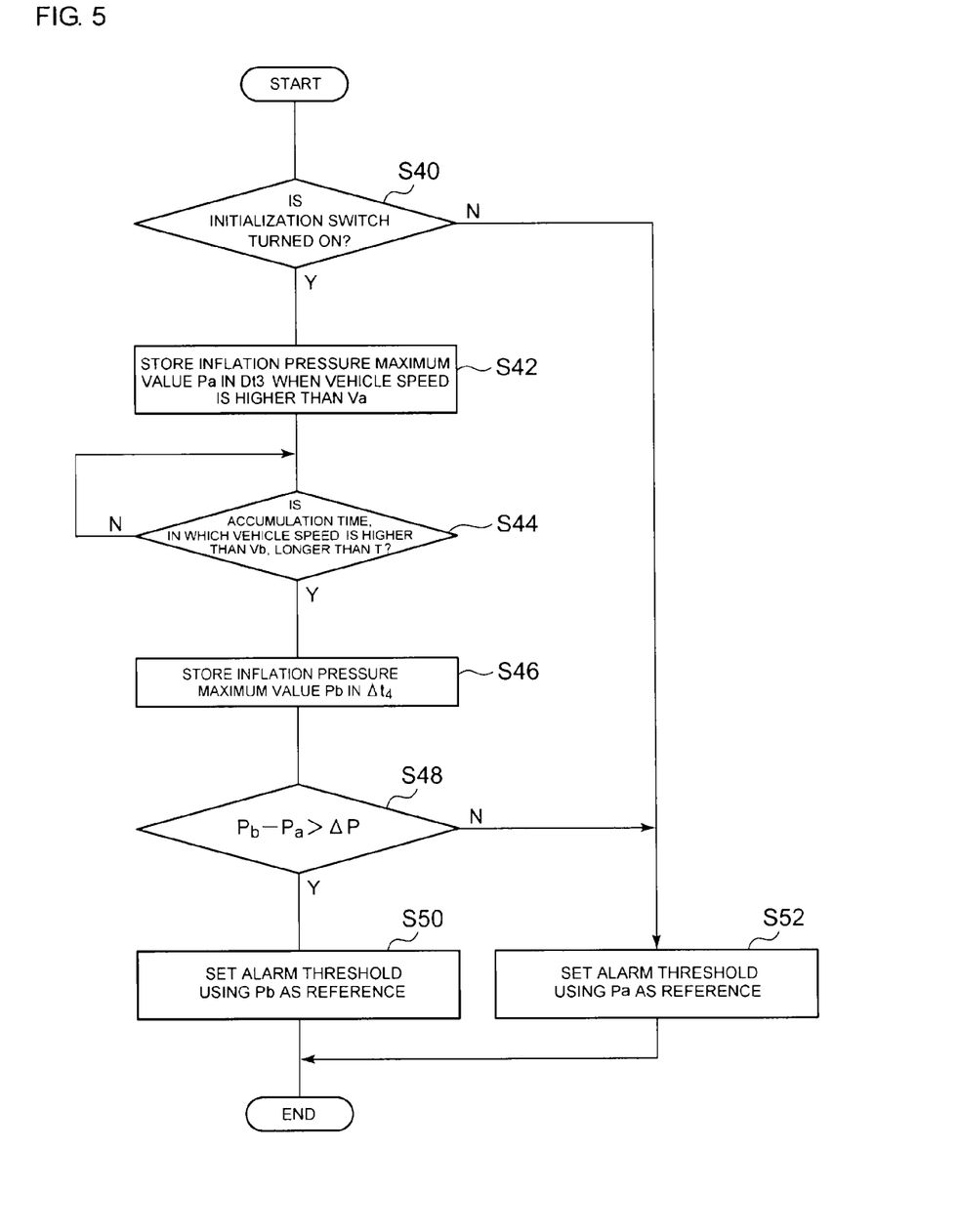
FIG. 5 is a flowchart of the case where there is no instruction from the body side to the wheel side.

FIG. 5 is a flowchart of the case where there is no instruction from the body side to the wheel side. The driver adjusts tire inflation pressure of a vehicle to a recommended inflation pressure determined by the vehicle manufacturer and, after that, turns on the initialization switch mounted in the interior of the vehicle or the like. In the case where the initialization switch is not turned on (No in step S40), it is determined that the tire inflation pressure is not adjusted, and the program advances to step S52 which will be described later. In the case where the initialization switch is turned on (Yes in step S40), the vehicle speed determining unit 42 calculates vehicle speed based on a detection signal from the wheel speed sensor 32, and determines whether the vehicle speed is greater than the predetermined threshold $V_a$ or not. When the vehicle speed becomes larger than $V_a$, the inflation pressure storing unit 50 stores the maximum tire inflation pressure in tire inflation pressures received in a period $\Delta t_3$ by the body-side communication device 25 as the immediately-after-start inflation pressure $P_a$ (S42).

Subsequently, the vehicle speed determining unit 42 obtains accumulation time of travel at a vehicle speed higher than the predetermined threshold $V_b$ with reference to a detection signal from the wheel speed sensor 32 and the count of the timer 46, and determines whether the accumulation time is longer than the threshold T or not (S44). When the accumulation time is equal to or less than the threshold T (No in step S44), subsequently, the accumulation time is obtained. When the accumulation time exceeds the threshold T (Yes in step S44), the inflation pressure storing unit 50 stores the maximum tire inflation pressure in tire inflation pressures received in $\Delta t_4$ by the body-side communication device 25 as an after-travel inflation pressure $P_b$ (S46).

The comparing unit 52 compares the difference between the after-travel inflation pressure $P_b$ and the immediately-after-start inflation pressure $P_a$ with the predetermined pressure $\Delta P$ (S48). When ($P_b-P_a$) is larger than $\Delta P$ (Yes in step S48), the reference pressure setting unit 54 sets the after-travel inflation pressure $P_b$ as a reference pressure of the tire inflation pressure determination (S50). When ($P_b-P_a$) is equal to or less than $\Delta P$ (No in step S48), the reference pressure setting unit 54 sets the immediately-after-start inflation pressure $P_a$ as a reference pressure of the tire inflation pressure determination (S52). Alternatively, the recommended inflation pressure may be set as the reference pressure. The alarm unit 56 monitors the tire inflation pressure transmitted from the body-side communication device 25. When the tire inflation pressure becomes below an alarm pressure threshold obtained by decreasing the reference pressure which is set in step S50 or S52 by a predetermined ratio, the alarm unit 56 makes the alarm 27 operate.

Since there is no instruction from the body side, the wheel-side communication device 22 does not shorten the transmission interval. Therefore, in steps S42 and S46, the periods $\Delta t_3$ and $\Delta t_4$ in which the inflation pressure storing unit 50 receives the tire inflation pressure are longer than $\Delta t_1$ and $\Delta t_2$ in FIG. 4, respectively.

Second Embodiment

Figure 6:
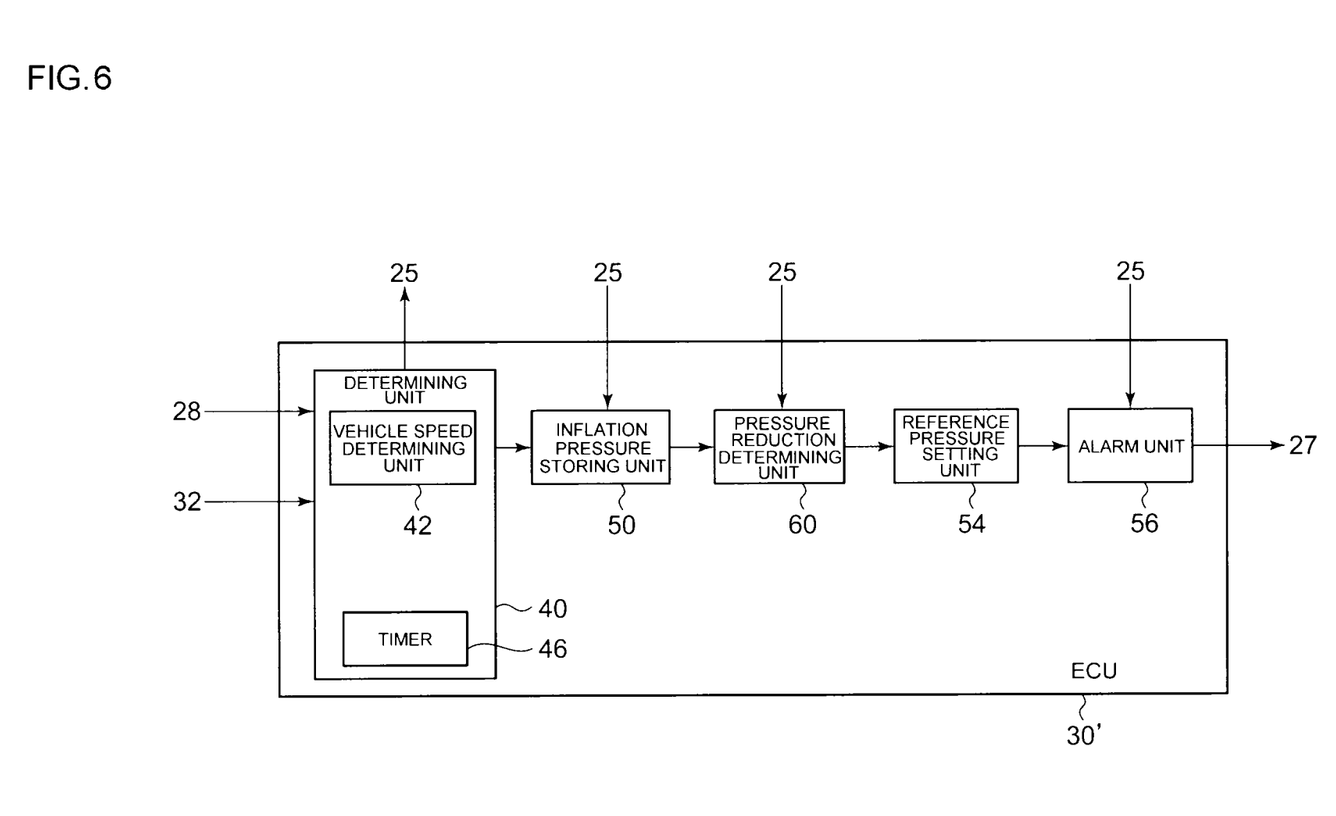
FIG. 6 is a functional block diagram of an ECU 30' according to a second embodiment.

FIG. 6 is a functional block diagram of an ECU 30' according to a second embodiment. In FIG. 6, in place of the comparing unit which compares the after-travel inflation pressure and the immediately-after inflation pressure shown in FIG. 3, a pressure reduction determining unit 60 that determines reduction of the tire inflation pressure is provided.

Figure 7:
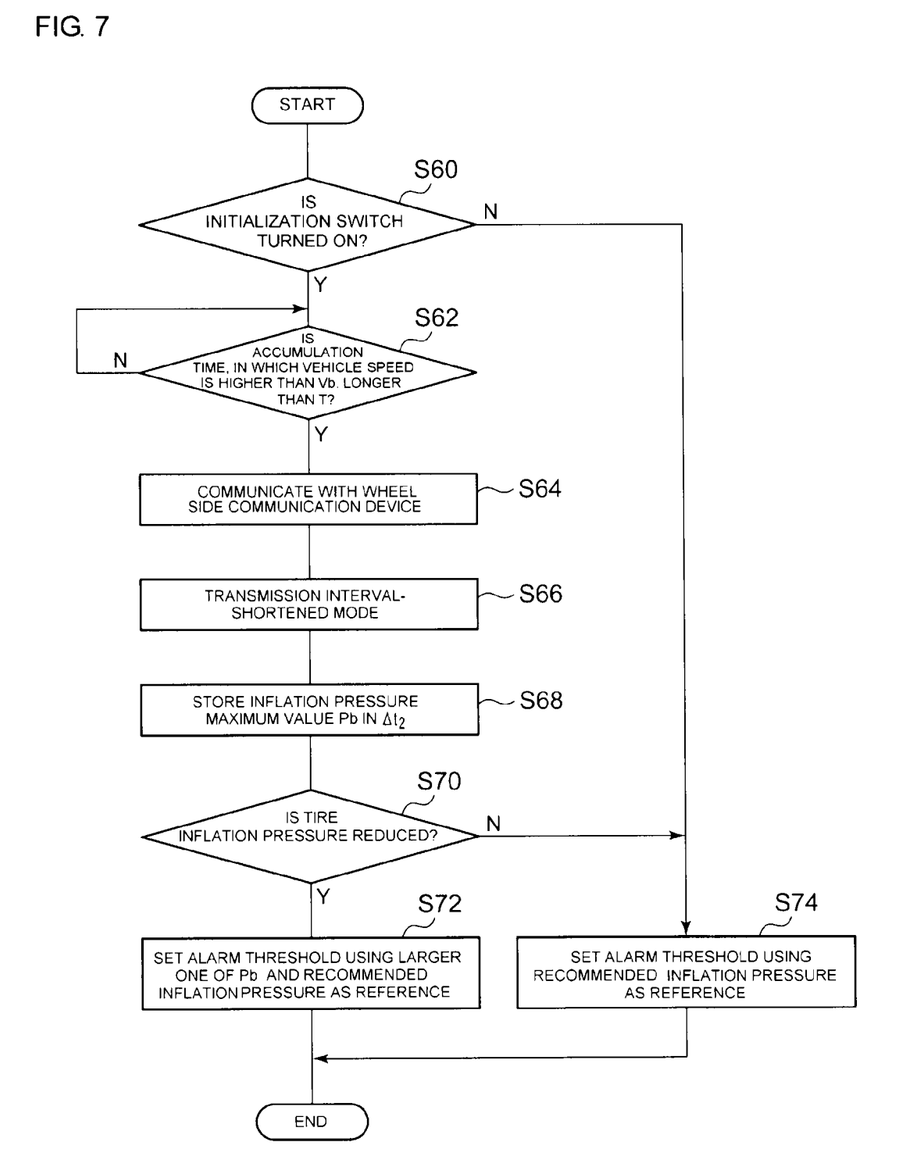
FIG. 7 is a flowchart showing tire inflation pressure monitoring according to the second embodiment.

FIG. 7 is a flowchart of tire inflation pressure monitoring according to the second embodiment. The driver adjusts tire inflation pressure of a vehicle to a recommended inflation pressure determined by the vehicle manufacturer and, after that, turns on the initialization switch mounted in the interior of the vehicle or the like. When the initialization switch is not turned on (No in step S60), it is determined that the tire inflation pressure is not adjusted, and the program advances to step S74 which will be described later. In the case where the initialization switch is turned on (Yes in step S60), the vehicle speed determining unit 42 obtains accumulation time of travel at a vehicle speed higher than a predetermined threshold $V_b$ (for example, 50 km/h) with reference to a detection signal from the wheel speed sensor 32 and the count of the timer 46, and determines whether the accumulation time is longer than a threshold T (for example, 15 minutes) or not (S62). When the accumulation time is equal to or less than the threshold T (No in step S62), subsequently, the accumulation time is obtained. When the accumulation time exceeds the threshold T (Yes in step S62), the vehicle speed determining unit 42 instructs the wheel-side communication device 22 to enter the transmission interval shortened mode (S64). The wheel-side communication device 22 transmits a tire inflation pressure detection value to the body-side communication device 25 only for a predetermined period $\Delta t_2$ in the transmission interval-shortened mode (S66), and the inflation pressure storing unit 50 stores the maximum tire inflation pressure in tire inflation pressures received in $\Delta t_2$ by the body-side communication device 25 as an after-travel inflation pressure $P_b$ (S68). The determination of step S62 is performed to determine that the temperature in the tire inflation chamber rises to a temperature close to saturation temperature when the vehicle travels under environment of a certain temperature (for example, 20° C.). As the thresholds $V_b$ and T, proper values are selected by an experiment or the like. Alternatively, the thresholds $V_b$ and T may be selected so that the tire inflation chamber temperature rises to a temperature obtained by decreasing the saturation temperature by a predetermined ratio.

The pressure reduction determining unit 60 continuously receives the tire inflation pressure from the body-side communication device 25 and calculates a time change amount $\Delta P/\Delta t$ of the tire inflation pressure, and determines whether $\Delta P/\Delta t < -\alpha$ (where $\alpha > 0$) is satisfied or not (S70). The constant $\alpha$ is set to a time change amount estimated as pressure reduction caused by puncture of a tire, not by air leakage which may occur in normal use. In the case where the tire inflation pressure decreases (Yes in step S70), the reference pressure setting unit 54 sets, as the reference pressure of a tire inflation pressure alarm, larger one of the after-travel inflation pressure $P_b$ stored in the inflation pressure storing unit 50 just before determination of pressure reduction and the recommended inflation pressure (S72). In the case where the tire inflation pressure does not decrease (No in step S70), the reference pressure setting unit 54 sets the recommended inflation pressure as the reference pressure of tire inflation pressure determination (S74). The alarm unit 56 monitors the tire inflation pressure transmitted from the body-side communication device 25. When the reference pressure set in step S72 or S74 becomes below a value obtained by decreasing the reference pressure which is set in step S72 or S74 by a predetermined ratio (for example, 10 to 20%), the alarm unit 56 makes the alarm 27 operate.

For example, in the case where, after the tire inflation pressure is adjusted indoor, the vehicle travels under low-temperature environment or on a snowy road, there is a possibility that the after-travel inflation pressure becomes below the recommended inflation pressure due to decrease in the tire inflation chamber temperature. Consequently, if an alarm pressure threshold is set using the after-travel inflation pressure, an alarm for puncture may get delayed. According to the embodiment, in the case where reduction in the tire inflation pressure is determined, the alarm pressure threshold is set based on the larger one of the after-travel inflation pressure $P_b$ stored just before and the recommended inflation pressure. Therefore, even in the case where the tire inflation chamber temperature is low, a proper alarm pressure threshold can be set.

In the flowchart of FIG. 7, an instruction to shorten the transmission interval is given from the body-side vehicle speed determining unit 42 to the wheel-side communication device 22. Alternatively, the reference pressure of the inflation pressure alarm may be set without the instruction from the body side to the wheel side.

Figure 8:
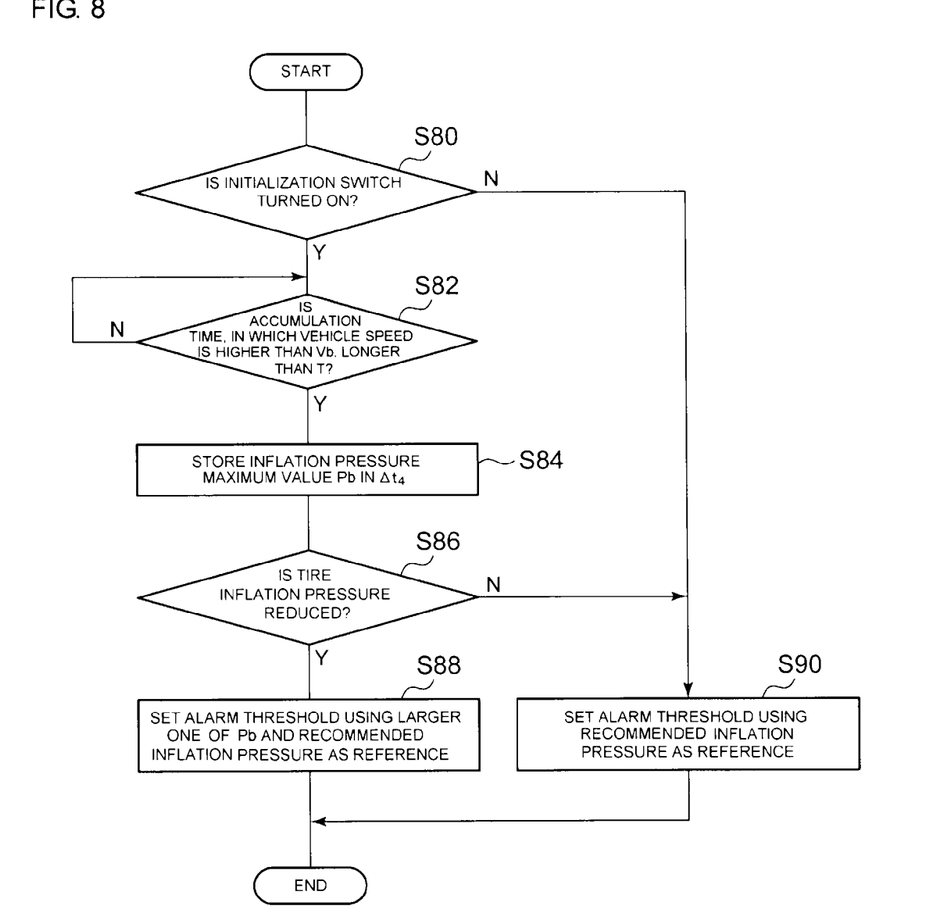
FIG. 8 is a flowchart of the case where there is no instruction from the body side to the wheel side.

FIG. 8 is a flowchart of the case where there is no instruction from the body side to the wheel side. The driver adjusts tire inflation pressure of a vehicle to a recommended inflation pressure determined by the vehicle manufacturer and, after that, turns on the initialization switch mounted in the interior of the vehicle or the like. In the case where the initialization switch is not turned on (No in step S80), it is determined that the tire inflation pressure is not adjusted, and the program advances to step S90 which will be described later. In the case where the initialization switch is turned on (Yes in step S80), the vehicle speed determining unit 42 obtains accumulation time of travel at a vehicle speed higher than the predetermined threshold $V_b$ with reference to a detection signal from the wheel speed sensor 32 and the count of the timer 46, and determines whether the accumulation time is longer than the threshold T or not (S82). When the accumulation time is equal to or less than the threshold T (No in step S82), subsequently, the accumulation time is obtained. When the accumulation time exceeds the threshold T (Yes instep S82), the inflation pressure storing unit 50 stores the maximum tire inflation pressure in tire inflation pressures received in the period $\Delta t_4$ by the body-side communication device 25 as an after-travel inflation pressure $P_b$ (S84).

The pressure reduction determining unit 60 continuously receives the tire inflation pressure from the body-side communication device 25 and calculates a time change amount $\Delta P/\Delta t$ of the tire inflation pressure, and determines whether $\Delta P/\Delta t < -\alpha$ (where $\alpha > 0$) is satisfied or not (S86). The constant $\alpha$ is set to a time change amount estimated as pressure reduction caused by puncture of a tire, not by air leakage which may occur in normal use. In the case where the tire inflation pressure decreases (Yes in step S86), the reference pressure setting unit 54 sets, as the reference pressure of a tire inflation pressure alarm, larger one of the after-travel inflation pressure $P_b$ stored in the inflation pressure storing unit 50 just before determination of pressure reduction and the recommended inflation pressure (S86). In the case where the tire inflation pressure does not decrease (No in step S86), the reference pressure setting unit 54 sets the recommended inflation pressure as the reference pressure of tire inflation pressure determination (S90). The alarm unit 56 monitors the tire inflation pressure transmitted from the body-side communication device 25. When the tire inflation pressure becomes below a value obtained by decreasing the reference pressure which is set in step S72 or S74 by a predetermined ratio (for example, 10 to 20%), the alarm unit 56 makes the alarm 27 operate.

In the above embodiment, which one of the wheels attached to a vehicle generates an alarm due to reduction in the tire inflation pressure is not considered. However, if a wheel whose tire inflation pressure decreases can be specified, it is preferable from the viewpoints of fixing or replacing a flat tire. Therefore, a unique ID code may be assigned as identification information for distinguishing a wheel from the other wheels to a storing unit of the wheel-side communication device 22 included in the wheel-side unit 20 of the wheel 14. For example, ID codes 1, 2, 3, and 4 are assigned to the wheel-side communication devices 22 attached to a right front wheel 14FR, a left front wheel 14FL, a right rear wheel 14RR, and a left rear wheel 14RL, respectively.

In a signal transmitted from each of the wheel-side communication device 22 to the body-side communication device 25 during travel of the vehicle 10, the ID code indicative of the wheel-side communication device 22 as a transmitter is included together with a detection signal of the inflation pressure sensor 21. At the time of performing the tire inflation pressure monitoring according to each of the above embodiments, the ECU 30 executes the monitoring on each of the wheels based on the ID code obtained together with the tire inflation pressure. The alarm 27 is provided with a function of visually or aurally notifying the driver of the wheel that has generated an alarm based on the ID code. In such a manner, a wheel on which the tire inflation pressure alarm is generated can be known.

In the above, the second embodiment has been described as the case where the inflation pressure sensor for detecting tire inflation pressure is provided for each wheel. However, the second embodiment may be used also for an indirect-type tire inflation pressure monitoring apparatus that determines reduction in the inflation pressure based on a signal of the wheel speed sensor without having an inflation pressure sensor. In such a tire inflation pressure monitoring apparatus, a wheel speed sensor is mounted adjacent to each wheel, and reduction in the inflation pressure of a specific tire can be detected based on differences in wheel speeds of a plurality of wheels. With the method, the step S70 in FIG. 7 and step S86 in FIG. 8 may be replaced. The other steps are similar to those described above.

Each of the above embodiments can be also used together with a vehicle having a mechanism of adjusting internal inflation pressure of a tire. On the body of the vehicle, an air tank and an air pump are mounted, and the vehicle has the function of pumping air into the air chamber of a wheel in accordance with an instruction from the ECU. Since such a vehicle is known, the detailed description will not be given. In this case, when the tire inflation pressure decreases, the ECU may generate an alarm and give an instruction of pumping air to a wheel whose tire inflation pressure decreased.

The present invention has been described above on the basis of some embodiments. The embodiments are illustrative and it is understood by a person skilled in the art that modifications such as an arbitrary combination of the embodiments and an arbitrary combination of the components and the processes of the embodiments are also within the scope of the present invention.

The present invention is not limited to the above embodiments but modifications such as various design changes may be also made based on the knowledge of a person skilled in the art. The configuration shown in each of the diagrams is provided to illustrate an example, and may be properly changed to a configuration capable of achieving similar functions.

INDUSTRIAL APPLICABILITY

According to the present invention, in a tire inflation pressure monitoring apparatus, a proper reference pressure for generating an inflation pressure alarm can be set.

What is claimed is:

1. A tire inflation pressure monitoring apparatus comprising:
   a tire inflation pressure obtaining unit which obtains a tire inflation pressure;
   an inflation pressure storing unit which stores a tire inflation pressure after start of travel of a vehicle as an after-travel inflation pressure;
   a comparing unit which determines whether or not a difference between the after-travel inflation pressure and a lowest reference pressure is larger than a predetermined pressure indicating that temperature of a tire inflation chamber rises higher than temperature immediately after start of the vehicle;
   a reference pressure setting unit which sets the after-travel inflation pressure as a reference pressure of tire inflation pressure determination when the difference is larger than the predetermined pressure, and sets the lowest reference pressure as a reference pressure of tire inflation pressure determination when the difference is equal to or less than the predetermined pressure; and
   an alarm unit which generates an alarm when the tire inflation pressure becomes below an alarm pressure threshold which is determined from the reference pressure.

2. The tire inflation pressure monitoring apparatus according to claim 1, wherein
the comparing unit uses a tire inflation pressure immediately after start of the vehicle as the lowest reference pressure.

3. The tire inflation pressure monitoring apparatus according to claim 1, wherein
the inflation pressure storing unit stores, as an after-travel inflation pressure, a tire inflation pressure when the vehicle travels at a vehicle speed equal to or higher than a predetermined speed for predetermined accumulation time.

4. The tire inflation pressure monitoring apparatus according to claim 3, further comprising a vehicle speed determining unit which shortens an interval of obtaining the tire inflation pressure when the accumulation time reaches predetermined time.

5. The tire inflation pressure monitoring apparatus according to claim 2, wherein
when the tire inflation pressure of the vehicle is adjusted to a recommended inflation pressure and the apparatus is initialized, the comparing unit uses a tire inflation pressure immediately after start of the vehicle as the lowest reference pressure.

6. The tire inflation pressure monitoring apparatus according to claim 2, wherein
the inflation pressure storing unit stores, as an after-travel inflation pressure, a tire inflation pressure when the vehicle travels at a vehicle speed equal to or higher than a predetermined speed for predetermined accumulation time.

7. The tire inflation pressure monitoring apparatus according to claim 6, further comprising a vehicle speed determining unit which shortens an interval of obtaining the tire inflation pressure when the accumulation time reaches predetermined time.

* * * * *